United States Patent
Tanaka et al.

(10) Patent No.: US 10,698,187 B2
(45) Date of Patent: Jun. 30, 2020

(54) EXTENDER LENS AND IMAGING APPARATUS

(71) Applicant: FUJIFILM Corporation, Tokyo (JP)

(72) Inventors: Takuya Tanaka, Saitama (JP); Yasutaka Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 178 days.

(21) Appl. No.: 16/120,475

(22) Filed: Sep. 4, 2018

(65) Prior Publication Data

US 2018/0373001 A1     Dec. 27, 2018

Related U.S. Application Data

(63) Continuation of application No. PCT/JP2017/007523, filed on Feb. 27, 2017.

(30) Foreign Application Priority Data

Mar. 16, 2016     (JP) ................. 2016-052015

(51) Int. Cl.
  *G02B 15/02*     (2006.01)
  *G02B 15/10*     (2006.01)
  *G02B 13/18*     (2006.01)
  *G02B 15/167*    (2006.01)

(52) U.S. Cl.
  CPC ............. *G02B 15/10* (2013.01); *G02B 13/18* (2013.01); *G02B 15/167* (2013.01)

(58) Field of Classification Search
  CPC ....... G02B 15/10; G02B 13/18; G02B 15/167
  USPC ................................ 359/674, 676
  See application file for complete search history.

(56) References Cited

U.S. PATENT DOCUMENTS

| 6,124,981 | A | 9/2000 | Ogawa |
| 2012/0019924 | A1 | 1/2012 | Shimomura |
| 2012/0026604 | A1 | 2/2012 | Aoi |
| 2012/0224269 | A1 | 9/2012 | Sakamoto |
| 2014/0118841 | A1 | 5/2014 | Toyama |
| 2014/0146397 | A1 | 5/2014 | Ikeda et al. |

(Continued)

FOREIGN PATENT DOCUMENTS

| CN | 102346292 A | 2/2012 |
| CN | 103649808 A | 3/2014 |
| CN | 103782217 A | 5/2014 |

(Continued)

OTHER PUBLICATIONS

Written Opinion issued in PCT/JP2017/007523; dated Jun. 27, 2017.

(Continued)

*Primary Examiner* — William Choi
(74) *Attorney, Agent, or Firm* — Studebaker & Brackett PC (57) ABSTRACT

An extender lens is removably inserted into a master lens, performs an increase in a focal length without changing an imaging position due to insertion, and consists of a positive first lens group and a negative second lens group in order from the object side. The first lens group consists of one or more positive lenses in order from the object side, and a three-lens cemented lens having three lenses of a positive lens, a negative lens, and a positive lens having cemented together in order from the object side. The following Conditional Expression (1) relating to an Abbe number v1n of the negative lens of the three-lens cemented lens is satisfied:

$$26 < v1n < 40. \qquad (1):$$

20 Claims, 8 Drawing Sheets

(56) References Cited

U.S. PATENT DOCUMENTS

2015/0226943 A1    8/2015   Ogata et al.

FOREIGN PATENT DOCUMENTS

| | | |
|---|---|---|
| JP | H11-183800 A | 7/1999 |
| JP | 2011-002563 A | 1/2011 |
| JP | 2011-075646 A | 4/2011 |
| JP | 2015-152618 A | 8/2015 |
| WO | 2013/031214 A1 | 3/2013 |

OTHER PUBLICATIONS

International Search Report issued in PCT/JP2017/007523; dated Jun. 27, 2017.
An Office Action mailed by The State Intellectual Property Office of People's Republic of China dated Feb. 3, 2019, which corresponds to Chinese Patent Application No. 201780016050.0 and is related to U.S. Appl. No. 16/120,475.

FIG. 1

FIG. 2
EXAMPLE 1

EXTENDER LENS AND IMAGING APPARATUS

CROSS REFERENCE TO RELATED APPLICATIONS

The present application is a Continuation of PCT International Application No. PCT/JP2017/007523 filed on Feb. 27, 2017, which claims priority under 35 U.S.C. § 119(a) to Japanese Patent Application No. 2016-052015 filed on Mar. 16, 2016. Each of the above applications is hereby expressly incorporated by reference in its entirety, into the present application.

BACKGROUND OF THE INVENTION

1. Field of the Invention

The present invention relates to an extender lens which is inserted into a master lens for imaging to thereby change the focal length of the whole lens system after insertion into a focal length side longer than the focal length of this master lens, and an imaging apparatus including this extender lens.

2. Description of the Related Art

Hitherto, in the field of a motion-picture camera or the like, an extender lens is used which is removably inserted into a master lens for imaging, and changes the focal length of the whole lens system after insertion into a focal length side longer than the focal length of the master lens. For example, JP2011-075646A and WO2013/031214A disclose a configuration in which a zooming optical system configured as four groups or five groups is used as a master lens, and an extender lens is inserted into a lens group closest to an image side which is stationary during zooming within this master lens.

SUMMARY OF THE INVENTION

In the recent image and video field, the demand for high image quality has increased, and high performance has also been required in a lens system. However, the extender lens disclosed in JP2011-075646A has larger spherical aberration and on-axis chromatic aberration, and a larger degradation in the performance of the whole lens system when inserted into the master lens, than at the recent request level. In addition, the extender lens disclosed in WO2013/031214A also has room for its improvement with respect to on-axis chromatic aberration of the whole lens system when inserted into the master lens in order to sufficiently respond to the recent request level.

The present invention has been contrived in view of such circumstances, and an object thereof is to provide an extender lens which has an action of changing the focal length of the whole lens system after insertion into a master lens into a focal length side longer than the focal length of this master lens, without changing an imaging position, while having a small spherical aberration and a small on-axis chromatic aberration with little degradation in its performance during insertion into the master lens, and an imaging apparatus including this extender lens.

According to the present invention, there is provided an extender lens, removably inserted into a master lens for imaging, which makes a focal length of a whole lens system after insertion longer than a focal length of the master lens while maintaining an imaging position constant, the extender lens comprising, in order from an object side: a first lens group having a positive refractive power as a whole; and a second lens group having a negative refractive power as a whole, wherein the first lens group consists of one or more positive lenses in order from the object side, and a three-lens cemented lens having three lenses of a positive lens, a negative lens, and a positive lens cemented together in order from the object side, and the following Conditional Expression (1) is satisfied, $$26 < \nu1n < 40 \quad (1)$$

where $\nu1n$ is an Abbe number of the negative lens constituting the three-lens cemented lens on the basis of a d line.

In the extender lens of the present invention, it is preferable to satisfy at least one of the following Conditional Expressions (2), (3), (6), ..., or (8), (1-1), ..., or (3-1), and (6-1), ..., or (8-1).

$$25 < \nu1pa - \nu1n < 35 \quad (2)$$

$$-5 < f1/f1n < -2 \quad (3)$$

$$1.9 < N1n < 2.05 \quad (6)$$

$$0.55 < \theta1n < 0.605 \quad (7)$$

$$0.3 < N1n - N1pa < 0.5 \quad (8)$$

$$28 < \nu1n < 35 \quad (1\text{-}1)$$

$$25 < \nu1pa - \nu1n < 32 \quad (2\text{-}1)$$

$$-3.5 < f1/f1n < -2.7 \quad (3\text{-}1)$$

$$1.95 < N1n < 2.05 \quad (6\text{-}1)$$

$$0.57 < \theta1n < 0.6 \quad (7\text{-}1)$$

$$0.33 < N1n - N1pa < 0.45 \quad (8\text{-}1)$$

where $\nu1pa$ is an average of Abbe numbers of positive lenses constituting the first lens group on the basis of the d line, $\nu1n$ is an Abbe number of the negative lens constituting the three-lens cemented lens on the basis of a d line, f1 is a focal length of the first lens group, f1n is a focal length of the negative lens constituting the three-lens cemented lens, N1n is a refractive index of the negative lens constituting the three-lens cemented lens at the d line, $\theta1n$ is a partial dispersion ratio of the negative lens constituting the three-lens cemented lens between a g line and an F line, and N1pa is an average of refractive indices of positive lenses constituting the first lens group at the d line.

In addition, in the extender lens of the present invention, it is preferable that the second lens group consists of one or more positive lenses and one or more negative lenses. In a case of such a configuration, it is preferable to satisfy at least one of the following Conditional Expressions (4), (5), (4-1), and (5-1), $$1.8 < N2a < 2.05 \quad (4)$$

$$-0.1 < N2na - N2pa < 0 \quad (5)$$

$$1.85 < N2a < 2.05 \quad (4\text{-}1)$$

$$-0.06 < N2na - N2pa < 0 \quad (5\text{-}1)$$

where N2a is an average of refractive indices of lenses constituting the second lens group at the d line, N2na is an average of refractive indices of negative lenses constituting the second lens group at the d line in a case where the second lens group includes a plurality of negative lens, and is a refractive index of a negative lens constituting the second lens group at the d line in a case where the second lens group includes one negative lens, and N2pa is an average of refractive indices of positive lenses constituting the second lens group at the d line in a case where the second lens group includes a plurality of positive lenses, and is a refractive index of a positive lens constituting the second lens group at the d line in a case where the second lens group includes one positive lens.

In the extender lens of the present invention, the number of positive lenses of the first lens group disposed closer to the object side than to the three-lens cemented lens of the first lens group may be configured to be equal to or less than two.

In the extender lens of the present invention, the second lens group may be configured to consist of two lenses. In such a case, the second lens group may be configured to consist of a cemented lens having a negative lens and a positive lens cemented together.

According to the present invention, there is provided an imaging apparatus comprising the extender lens of the present invention.

Meanwhile, the wordings "consists of ~" and "consist(ing) of ~" mean to be substantial, and lenses having no power substantially, optical elements, other than a lens, such as a stop and/or cover glass, mechanism portions such as a lens flange, a lens barrel, and/or a camera-shake correction mechanism, and the like may be included in addition to the things enumerated as elements.

Meanwhile, the wording "while maintaining an imaging position constant" means to be substantial. For example, in a case where the imaging apparatus is constituted by disposing an imaging element on the imaging surface of the master lens, and a case where the pixel pitch of this imaging element is set to p, and the F-Number of the whole lens system having the extender lens inserted therein is set to AFN, an allowable amount of change of an imaging position before and after the insertion of the extender lens can be set to a range of $-4 \times p \times AFN$ to $+4 \times p \times AFN$.

Meanwhile, the sign of the refractive power of the lens group, the sign of the refractive power of the lens, and the surface shape of the lens are assumed to be those in a paraxial region in a case where an aspherical surface is included. In addition, the above conditional expressions are all based on the d line (a wavelength of 587.6 nm, where nm represents nanometer) unless otherwise noted.

Meanwhile, a partial dispersion ratio $\theta gF$ of a certain lens between a g line and an F line is defined by $\theta gF=(Ng-NF)/(NF-NC)$ in a case where the refractive indices of the lens at a g line (a wavelength of 435.8 nm), an F line (a wavelength of 486.1 nm), and a C line (a wavelength of 656.3 nm) are set to Ng, NF, and NC, respectively.

According to the present invention, in the extender lens that consists of a positive first lens group and a negative second lens group in order from an object side, the configuration of lenses included in the first lens group is suitably set and is set so as to satisfy predetermined conditional expressions. Therefore, it is possible to provide an extender lens which has an action of changing the focal length of the whole lens system after insertion into a master lens into a focal length side longer than the focal length of this master lens, without changing an imaging position, while having a small spherical aberration and a small on-axis chromatic aberration with little degradation in its performance during insertion into the master lens, and an imaging apparatus including this extender lens.

DESCRIPTION OF THE PREFERRED EMBODIMENTS

Hereinafter, an embodiment of the present invention will be described in detail with reference to the accompanying drawings. An extender lens EX according to the present embodiment is removably inserted into a master lens ML for imaging, and makes the focal length of the whole lens system (complex lens system of the master lens ML and the extender lens EX) after insertion longer than the focal length of the master lens ML while maintaining an imaging position constant. That is, the position of an imaging surface of the simplex master lens ML before this extender lens EX is inserted and the position of an imaging surface Sim of the whole lens system after the extender lens EX is inserted are coincident with each other, and a focal length is magnified due to the insertion of the extender lens EX.

An example of the master lens ML includes an imaging lens capable of being mounted in imaging apparatuses such as a motion-picture camera, a broadcast camera, a video camera, a digital camera, and/or a surveillance camera.

Figure 1:
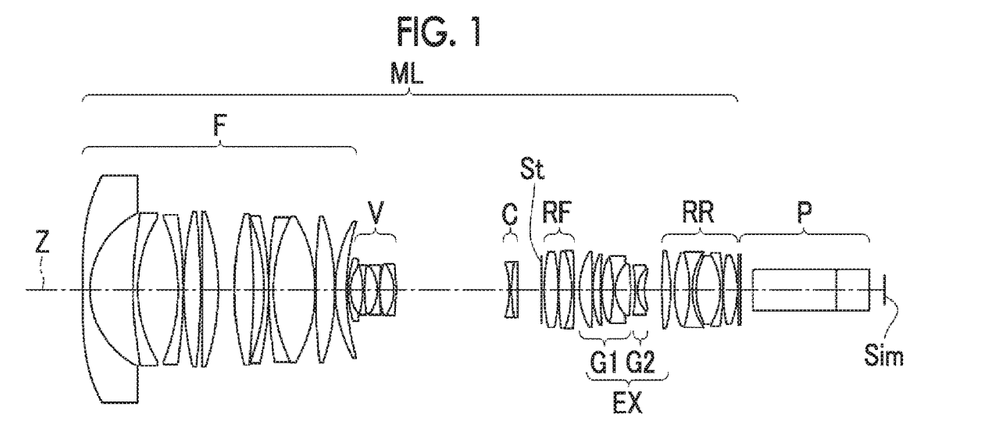
FIG. 1 is a cross-sectional view illustrating a configuration in a state where an extender lens according to an embodiment of the present invention is inserted into a master lens.
Figure 2:
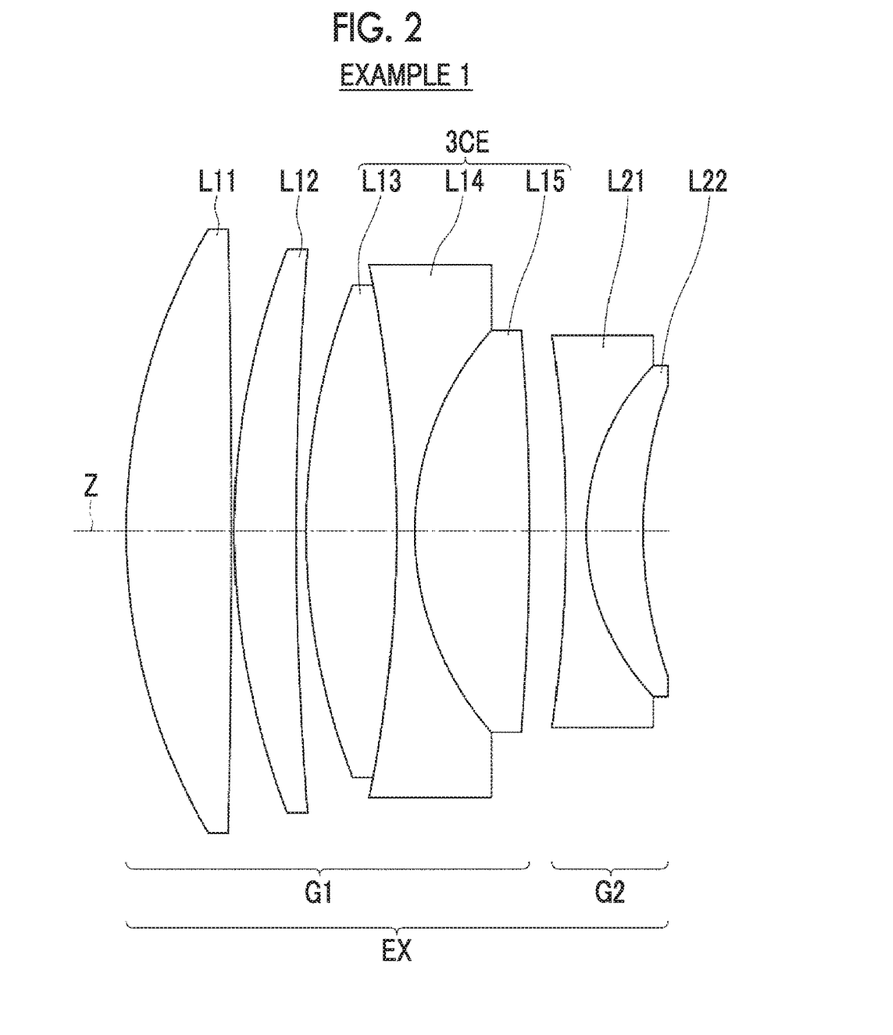
FIG. 2 is a cross-sectional view illustrating a configuration of an extender lens of Example 1 of the present invention.

FIG. 1 is a cross-sectional view illustrating a configuration in a state where the extender lens EX according to an embodiment of the present invention is inserted into the master lens ML. FIG. 2 is a cross-sectional view illustrating a configuration of the extender lens EX of FIG. 1. The extender lens EX which is an example shown in FIG. 2 corresponds to Example 1 described later. In FIGS. 1 and 2, the left side is an object side, and the right side is an image side.

The master lens ML illustrated in FIG. 1 is a zoom lens, and consists of a focus lens group F, a variator lens group V, a compensator lens group C, a stop St, a relay lens front group RF, and a relay lens rear group RR, in order from the object side. The relay lens group configured to compose the relay lens front group RF and the relay lens rear group RR has an imaging action. During zooming, the focus lens group F, the relay lens front group RF, and the relay lens rear group RR remain stationary with respect to the imaging surface Sim, and the variator lens group V and the compensator lens group C are configured to move by changing a mutual distance in the direction of an optical axis.

The relay lens front group RF and the relay lens rear group RR in the example of FIG. 1 are disposed at a predetermined air distance. In the state of the master lens ML focused on an infinite object, the relay lens front group RF and the relay lens rear group RR are configured such that substantially parallel light passes through a space therebetween. The extender lens EX is removably inserted between the relay lens front group RF and the relay lens rear group RR as described above, and thus it becomes easy to magnify a focal length due to the insertion of the extender lens EX while maintaining an imaging position constant.

Meanwhile, when a lens system is applied to an imaging apparatus, it is preferable to include various types of filters, a prism, and/or protective cover glass according to the specification of the imaging apparatus. Thus, in FIG. 1, an example is shown in which an optical member P of which the incidence surface and the emission surface oriented to these elements are perpendicular to an optical axis Z is disposed between the lens system and the imaging surface Sim. However, the optical member P can be omitted in the present invention.

This extender lens EX consists of a first lens group G1 having a positive refractive power as a whole and a second lens group G2 having a negative refractive power as a whole, in order from the object side toward the image side along the optical axis Z. With such a configuration, it becomes easy to make the extender lens EX to have an action of increasing a focal length, without changing an imaging position before and after the insertion of the extender lens EX.

In the example shown in FIG. 2, the first lens group G1 is composed of five lenses in which a positive lens L11, a positive lens L12, a positive lens L13, a negative lens L14, and a positive lens L15 are disposed in order from the object side, and the second lens group G2 is composed of two lenses in which a negative lens L21 and a positive lens L22 are disposed in order from the object side. However, in the present invention, the number of lenses of the first lens group G1, the number of lenses of the second lens group G2, and/or the array order of negative and positive lenses of the second lens group G2 can also have configurations different from those in the example shown in FIG. 2 adopted therein.

The first lens group G1 consists of one or more positive lenses and a three-lens cemented lens 3CE, in order from the object side. This three-lens cemented lens 3CE has three lenses of a positive lens, a negative lens, and a positive lens cemented together in order from the object side. The first lens group G1 has one or more positive lenses other than a positive lens constituting the three-lens cemented lens 3CE, and thus it is possible to give a sufficient positive refractive power to the first lens group G1.

It is preferable that the number of positive lenses of the first lens group G1 disposed closer to the object side than to the three-lens cemented lens 3CE of the first lens group G1 is equal to or less than two. That is, it is preferable that the first lens group G1 is configured to consist of one or two positive lenses and the three-lens cemented lens 3CE in order from the object side. In such a case, it is possible to prevent the length of the extender lens EX in the direction of the optical axis from increasing excessively. Since the extender lens EX has a limitation on its length in the direction of the optical axis due to being disposed inside the master lens ML, it is preferable that the number of lenses is restricted to this range.

In the three-lens cemented lens 3CE, the cemented lens is formed in which positive, negative and positive lenses are cemented together in order from the object side. Thereby, as compared with a two-lens cemented lens in which positive and negative lenses are cemented together in order from the object side, it is possible to reduce the absolute value of the curvature radius of a cemented surface serving as an image-side surface of a negative lens within the cemented lens, and to satisfactorily correct spherical aberration which is generated in a positive lens located closer to the object side than to the negative lens. In addition, since first-order chromatic aberration can be corrected even in a case where a difference between the Abbe numbers of object-side and image-side lenses on at least one cemented surface out of two cemented surfaces is reduced, it is possible to select materials close to a partial dispersion ratio as materials of these lenses, and to correct the first-order chromatic aberration while suppressing the generation of second-order chromatic aberration. Spherical aberration and on-axis chromatic aberration which are generated in the positive lens of the first lens group G1 are corrected within the first lens group G1, and thus lateral chromatic aberration can also be simultaneously corrected in addition to the spherical aberration and the on-axis chromatic aberration. Therefore, it is advantageous to dispose the three-lens cemented lens 3CE within the first lens group G1. In a case where the spherical aberration and the on-axis chromatic aberration which are generated in the positive lens of the first lens group G1 are attempted to be corrected away from the first lens group G1, it is difficult to obtain the same effect as described above due to on-axis and off-axis correction actions being different from each other.

It is preferable that the second lens group G2 consists of one or more negative lenses and one or more positive lenses. With such a configuration, it is possible to return light flux converged in the first lens group G1 in parallel while correcting various aberrations. In a case where the extender lens EX is inserted into an optical path of substantially parallel light within the relay lens group as described above, such a configuration is advantageous.

The second lens group G2 may be configured to consist of two lenses. With such a configuration, it is possible to prevent the length of the extender lens EX in the direction of the optical axis from increasing excessively. In such a case, the second lens group G2 may be configured to consist of one negative lens and one positive lens. Further, the second lens group G2 may be configured to consist of a cemented lens having a negative lens and a positive lens cemented together. In such a case, it is possible to suppress the generation of fifth- or higher-order spherical aberration while increasing the refractive power of each of the negative lens and the positive lens.

This extender lens EX is configured to satisfy the following Conditional Expression (1).

$$26 < \nu 1n < 40 \tag{1}$$

Here, ν1n is an Abbe number of the negative lens constituting the three-lens cemented lens on the basis of a d line.

The value (ν1n) is not set to be equal to or less than the lower limit of Conditional Expression (1), and thus it is possible to select a material having a small partial dispersion ratio, and to suppress the generation of the second-order chromatic aberration. The value (ν1n) is not set to be equal to or greater than the upper limit of Conditional Expression (1), and thus it is possible to satisfactorily correct the first-order chromatic aberration. It is preferable to satisfy the following Conditional Expression (1-1) in order to enhance the effect of Conditional Expression (1).

$$28 < \nu 1n < 35 \tag{1-1}$$

Further, it is preferable to satisfy the following Conditional Expression (2).

$$25 < \nu 1pa - \nu 1n < 35 \tag{2}$$

Here, ν1pa is an average of Abbe numbers of positive lenses constituting the first lens group on the basis of the d line, and ν1n is an Abbe number of the negative lens constituting the three-lens cemented lens on the basis of the d line.

The value (ν1pa−ν1n) is not set to be equal to or less than the lower limit of Conditional Expression (2), and thus it is possible to satisfactorily correct the first-order chromatic aberration. The value (ν1pa−ν1n) is not set to be equal to or greater than the upper limit of Conditional Expression (2), and thus it is possible to select materials of the positive lens of the first lens group G1 and the negative lens of the first lens group G1 which are close to each other in partial dispersion ratio, and to suppress the generation of the second-order chromatic aberration. It is preferable to satisfy the following Conditional Expression (2-1) in order to enhance the effect of the upper limit of Conditional Expression (2) while obtaining the effect of the lower limit thereof.

$$25 < \nu 1pa - \nu 1n < 32 \tag{2-1}$$

In addition, it is preferable to satisfy the following Conditional Expression (3).

$$-5 < f1/f1n < -2 \tag{3}$$

Here, f1 is a focal length of the first lens group, and
f1n is a focal length of the negative lens constituting the three-lens cemented lens.

The ratio of the refractive power of the negative lens of the first lens group G1 to the refractive power of the first lens group G1 is set to fall within the range of Conditional Expression (3), and thus it is possible to facilitate the correction of spherical aberration which is generated in the positive lens of the first lens group G1. It is preferable to satisfy the following Conditional Expression (3-1) in order to enhance the effect of Conditional Expression (3).

$$-3.5 < f1/f1n < -2.7 \tag{3-1}$$

In a case where the second lens group G2 consists of one or more positive lenses and one or more negative lenses, it is preferable to satisfy the following Conditional Expression (4).

$$1.8 < N2a < 2.05 \tag{4}$$

Here, N2a is an average of refractive indices of lenses constituting the second lens group at the d line.

The value (N2a) is not set to be equal to or less than the lower limit of Conditional Expression (4), and thus it is possible to suppress various aberrations which are generated in the first lens group G1, particularly, spherical aberration and astigmatism while suppressing the length of the extender lens EX in the direction of the optical axis. The value (N2a) is not set to be equal to or greater than the upper limit of Conditional Expression (4), and thus it becomes easy to select a suitable material so as to be capable of securing a difference between the Abbe number of the positive lens and the Abbe number of the negative lens, which leads to the advantage of the correction of chromatic aberration. It is preferable to satisfy the following Conditional Expression (4-1) in order to enhance the effect of the lower limit of Conditional Expression (4) while obtaining the effect of the upper limit thereof.

$$1.85 < N2a < 2.05 \tag{4-1}$$

In addition, in a case where the second lens group G2 consists of one or more positive lenses and one or more negative lenses, it is preferable to satisfy the following Conditional Expression (5).

$$-0.1 < N2na - N2pa < 0 \tag{5}$$

Here, N2na is an average of refractive indices of negative lenses constituting the second lens group at the d line in a case where the second lens group includes a plurality of negative lens, and is a refractive index of a negative lens constituting the second lens group at the d line in a case where the second lens group includes one negative lens, and N2pa is an average of refractive indices of positive lenses constituting the second lens group at the d line in a case where the second lens group includes a plurality of positive lenses, and is a refractive index of a positive lens constituting the second lens group at the d line in a case where the second lens group includes one positive lens.

The value (N2na−N2pa) is not set to be equal to or less than the lower limit of Conditional Expression (5), and thus it is possible to suppress the generation of a field curvature. The value (N2na−N2pa) is not set to be equal to or greater than the upper limit of Conditional Expression (5), and thus it is possible to facilitate the correction of spherical aberration. It is preferable to satisfy the following Conditional Expression (5-1) in order to enhance the effect of the lower limit of Conditional Expression (5) while obtaining the effect of the upper limit thereof.

$$-0.06 < N2na - N2pa < 0 \tag{5-1}$$

In addition, it is preferable to satisfy the following Conditional Expression (6).

$$1.9 < N1n < 2.05 \tag{6}$$

Here, N1n is a refractive index of the negative lens constituting the three-lens cemented lens at the d line.

The value (N1n) is not set to be equal to or less than the lower limit of Conditional Expression (6), and thus it is possible to facilitate the correction of spherical aberration. The value (N1n) is not set to be equal to or greater than the upper limit of Conditional Expression (6), and thus it is possible to select a material having a suitable partial dispersion ratio, which leads to the facilitation of the correction of the second-order chromatic aberration. It is preferable to satisfy the following Conditional Expression (6-1) in order to enhance the effect of the lower limit of Conditional Expression (6) while obtaining the effect of the upper limit thereof.

$$1.95 < N1n < 2.05 \quad (6\text{-}1)$$

In addition, it is preferable to satisfy the following Conditional Expression (7).

$$0.55 < \theta1n < 0.605 \quad (7)$$

Here, θ1n is a partial dispersion ratio of the negative lens constituting the three-lens cemented lens between a g line and an F line.

The value (θ1n) is not set to be equal to or less than the lower limit of Conditional Expression (7), and thus it is possible to select a material having a suitable Abbe number, which leads to the facilitation of the correction of the first-order chromatic aberration. The value (θ1n) is not set to be equal to or greater than the upper limit of Conditional Expression (7), and thus it is possible to suppress the generation of the second-order chromatic aberration. It is preferable to satisfy the following Conditional Expression (7-1) in order to enhance the effect of Conditional Expression (7).

$$0.57 < \theta1n < 0.6 \quad (7\text{-}1)$$

In addition, it is preferable to satisfy the following Conditional Expression (8).

$$0.3 < N1n - N1pa < 0.5 \quad (8)$$

Here, N1n is a refractive index of the negative lens constituting the three-lens cemented lens at the d line, and N1pa is an average of refractive indices of positive lenses constituting the first lens group at the d line.

The value (N1n−N1pa) is not set to be equal to or less than the lower limit of Conditional Expression (8), and thus it becomes easy to correct a field curvature. The value (N1n−N1pa) is not set to be equal to or greater than the upper limit of Conditional Expression (8), and thus it is possible to prevent the refractive index of the negative lens within the three-lens cemented lens 3CE from increasing excessively, and to prevent the absolute value of the curvature radius of a cemented surface within the three-lens cemented lens 3CE from increasing excessively, which leads to the facilitation of the correction of spherical aberration. It is preferable to satisfy the following Conditional Expression (8-1) in order to enhance the effect of Conditional Expression (8).

$$0.33 < N1n - N1pa < 0.45 \quad (8\text{-}1)$$

Meanwhile, the above-mentioned preferred configurations and/or available configurations can be arbitrarily combined, and it is preferable that the configurations are appropriately selectively adopted in accordance with required specification.

Next, numerical value examples of the master lens ML and numerical value examples of the extender lens EX of the present invention will be described.

[Master Lens]

Table 1 shows basic lens data of the master lens ML of FIG. 1. In Table 1, the column of Si shows a surface number i (i=1, 2, 3, . . . ) attached to an i-th surface of the elements, where a surface on the object side of an element closest to the object side is regarded as a first surface and i sequentially increases toward the image side, the column of Ri shows a curvature radius of the i-th surface, and the column of Di shows a surface distance between the i-th surface and an (i+1)-th surface on the optical axis Z. In Table 1, the column of Ndj shows a refractive index of a j-th (j=1, 2, 3, . . . ) element at the d line (a wavelength of 587.6 nm, where nm represents nanometer), where the element closest to the object side is regarded as the first element and j sequentially increases toward the image side, the column of vdj shows an Abbe number of the j-th element on the basis of the d line, and the column of θgFj shows a partial dispersion ratio of the j-th element between the g line (a wavelength of 435.8 nm) and the F line (a wavelength of 486.1 nm).

Here, the sign of the curvature radius is set to be positive with respect to a surface shape with its convex surface toward the object side, and is set to be negative with respect to a surface shape with its convex surface toward the image side. Table 1 also shows the optical member P and the stop St together. In the table, a surface number and a term of (St) are written in the place of the surface number of a surface equivalent to the stop St. The value in the lowermost place of Di is a distance between the surface closest to the image side in the table and the imaging surface Sim. In Table 1, regarding the variable surface distance changing during zooming, the symbol of DD[ ] is used, and the surface number of this distance on the object side is attached to the inside of [ ] and is written in the column of Di.

Table 2 shows a zoom ratio Zr of the master lens ML of FIG. 1, a focal length f of the whole system, an F-Number FNo., the maximum total angle of view 2ω, and variable surface distances, on the basis of the d line. (°) in the place of 2ω means that the unit thereof is a degree. In Table 2, each value in a wide-angle end state is shown in the place denoted by WIDE, and each value in a telephoto end state is shown in the place denoted by TELE. The values of Table 1 and Table 2 are set to be in a state of being focused on an infinite object.

In Table 1, mark * is attached to the surface number of an aspherical surface, and the numerical values of a paraxial curvature radius are written in the column of the curvature radius of the aspherical surface. Table 3 shows an aspherical coefficient of each aspherical surface of Example 1. "E−n" (n is an integer) of the numerical value of the aspherical coefficient of Table 3 means "×10$^{-n}$". The aspherical coefficient is a value of each of coefficients KA and Am (m=3, 4, 5, . . . 11) in an aspherical expression represented by the following expression.

$$Zd = \frac{C \times h^2}{1 + \sqrt{1 - KA \times C^2 \times h^2}} + \sum_m Am \times h^m \quad \text{[Expression 1]}$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis to a lens surface), C is a paraxial curvature, and KA and Am are aspherical coefficients.

For data of each table, a degree is used as the unit of an angle, and mm is used as the unit of a length, but it is also possible to use other appropriate units since the optical system can be used even in a case where the system is magnified or reduced in proportion. In addition, each of the following tables describes numerical values rounded off to predetermined decimal places.

TABLE 1

Master Lens

| Si | Ri | Di | Ndj | vdj | θgFj |
|---|---|---|---|---|---|
| *1 | 634.83390 | 3.000 | 1.80100 | 34.97 | 0.58642 |
| 2 | 33.75712 | 17.000 | | | |
| *3 | 124.11505 | 2.000 | 1.49700 | 81.54 | 0.53748 |
| 4 | 56.42767 | 16.000 | | | |
| 5 | −72.37997 | 1.945 | 1.95375 | 32.32 | 0.59015 |
| 6 | −203.08358 | 0.300 | | | |
| 7 | 136.36991 | 6.582 | 1.84666 | 23.78 | 0.61923 |
| 8 | −278.75785 | 0.750 | | | |
| 9 | −2214.28465 | 6.344 | 1.53775 | 74.70 | 0.53936 |
| 10 | −94.01203 | 6.165 | | | |
| 11 | 114.90374 | 7.653 | 1.43875 | 94.66 | 0.53402 |
| *12 | −181.23707 | 4.135 | | | |
| 13 | −76.79981 | 1.800 | 1.80100 | 34.97 | 0.58642 |
| 14 | −125.81550 | 0.120 | | | |
| 15 | 185.21220 | 1.800 | 1.95375 | 32.32 | 0.59015 |
| 16 | 64.62698 | 16.603 | 1.43875 | 94.66 | 0.53402 |
| 17 | −57.45342 | 0.120 | | | |
| 18 | 268.19846 | 7.675 | 1.43387 | 95.18 | 0.53733 |
| 19 | −89.92154 | 0.120 | | | |
| 20 | 54.86266 | 4.510 | 1.72916 | 54.68 | 0.54451 |
| 21 | 95.46056 | DD[21] | | | |
| 22 | 39.34813 | 0.800 | 2.00100 | 29.13 | 0.59952 |

TABLE 1-continued

Master Lens

| Si | Ri | Di | Ndj | vdj | θgFj |
|---|---|---|---|---|---|
| 23 | 15.52524 | 4.862 | | | |
| 24 | −33.35899 | 0.800 | 1.91082 | 35.25 | 0.58224 |
| 25 | 79.25759 | 5.012 | 1.80518 | 25.42 | 0.61616 |
| 26 | −15.83685 | 0.810 | 1.77250 | 49.60 | 0.55212 |
| 27 | 73.32791 | 0.120 | | | |
| 28 | 34.34982 | 5.742 | 1.69895 | 30.13 | 0.60298 |
| 29 | −17.37568 | 0.800 | 1.95375 | 32.32 | 0.59015 |
| 30 | −74.61052 | DD[30] | | | |
| 31 | −33.55731 | 0.810 | 1.72916 | 54.68 | 0.54451 |
| 32 | 59.29751 | 2.386 | 1.84661 | 23.88 | 0.62072 |
| 33 | −1461.61713 | DD[33] | | | |
| 34(St) | ∞ | 1.000 | | | |
| *35 | 64.33975 | 5.728 | 1.80610 | 40.88 | 0.56889 |
| 36 | −72.49509 | 0.120 | | | |
| 37 | 132.25836 | 5.132 | 1.51742 | 52.43 | 0.55649 |
| 38 | −44.17611 | 1.000 | 1.95375 | 32.32 | 0.59015 |
| 39 | −232.64823 | 34.530 | | | |
| 40 | 251.74948 | 3.389 | 1.84661 | 23.88 | 0.62072 |
| 41 | −69.00499 | 1.311 | | | |
| 42 | 41.82568 | 6.077 | 1.58913 | 61.13 | 0.54067 |
| 43 | −51.65585 | 1.000 | 1.95375 | 32.32 | 0.59015 |
| 44 | 26.55522 | 1.636 | | | |
| 45 | 30.91083 | 9.581 | 1.53775 | 74.70 | 0.53936 |
| 46 | −26.27377 | 1.000 | 1.95375 | 32.32 | 0.59015 |
| 47 | −89.88638 | 0.120 | | | |

TABLE 1-continued

Master Lens

| Si | Ri | Di | Ndj | vdj | θgFj |
|---|---|---|---|---|---|
| 48 | 69.58120 | 5.697 | 1.48749 | 70.24 | 0.53007 |
| 49 | −35.77275 | 0.200 | | | |
| 50 | ∞ | 1.000 | 1.51633 | 64.14 | 0.53531 |
| 51 | ∞ | 4.940 | | | |
| 52 | ∞ | 33.000 | 1.60859 | 46.44 | 0.56664 |
| 53 | ∞ | 13.200 | 1.51633 | 64.05 | 0.53463 |
| 54 | ∞ | 5.882 | | | |

TABLE 2

Master Lens

| | WIDE | TELE |
|---|---|---|
| Zr | 1.0 | 12.6 |
| f | 4.668 | 58.586 |
| FNo. | 1.85 | 2.66 |
| 2ω(°) | 105.2 | 10.8 |
| DD[21] | 0.700 | 47.210 |
| DD[30] | 44.529 | 5.768 |
| DD[33] | 9.498 | 1.749 |

TABLE 3

Master Lens

| SURFACE NUMBER | 1 | 3 | 12 | 35 |
|---|---|---|---|---|
| KA | 1.0000000E+00 | 1.0000000E+00 | 1.0000000E+00 | 1.0000000E+00 |
| A3 | 7.7331900E−08 | 1.2511589E−06 | 3.1471918E−07 | 7.5666665E−08 |
| A4 | 2.1574272E−06 | −1.2362781E−06 | 9.9931720E−07 | −2.9675868E−06 |
| A5 | 6.8538000E−08 | 1.7200180E−07 | 6.2756751E−08 | 7.5246634E−08 |
| A6 | −1.1993261E−09 | −2.0836149E−08 | −9.2537362E−09 | −2.4769474E−08 |
| A7 | 4.1083592E−11 | 1.4165625E−09 | 7.9132266E−10 | 4.8852246E−09 |
| A8 | −1.3620966E−12 | −5.5095567E−11 | −4.1967354E−11 | −5.4987517E−10 |
| A9 | 2.9609313E−14 | 9.3002972E−13 | 1.3194435E−12 | 3.6613236E−11 |
| A10 | −3.3115915E−16 | 7.0894937E−16 | −2.2782601E−14 | −1.3249378E−12 |
| A11 | 1.5754046E−18 | −1.3733415E−16 | 1.6628971E−16 | 1.9926583E−14 |

Figure 5:
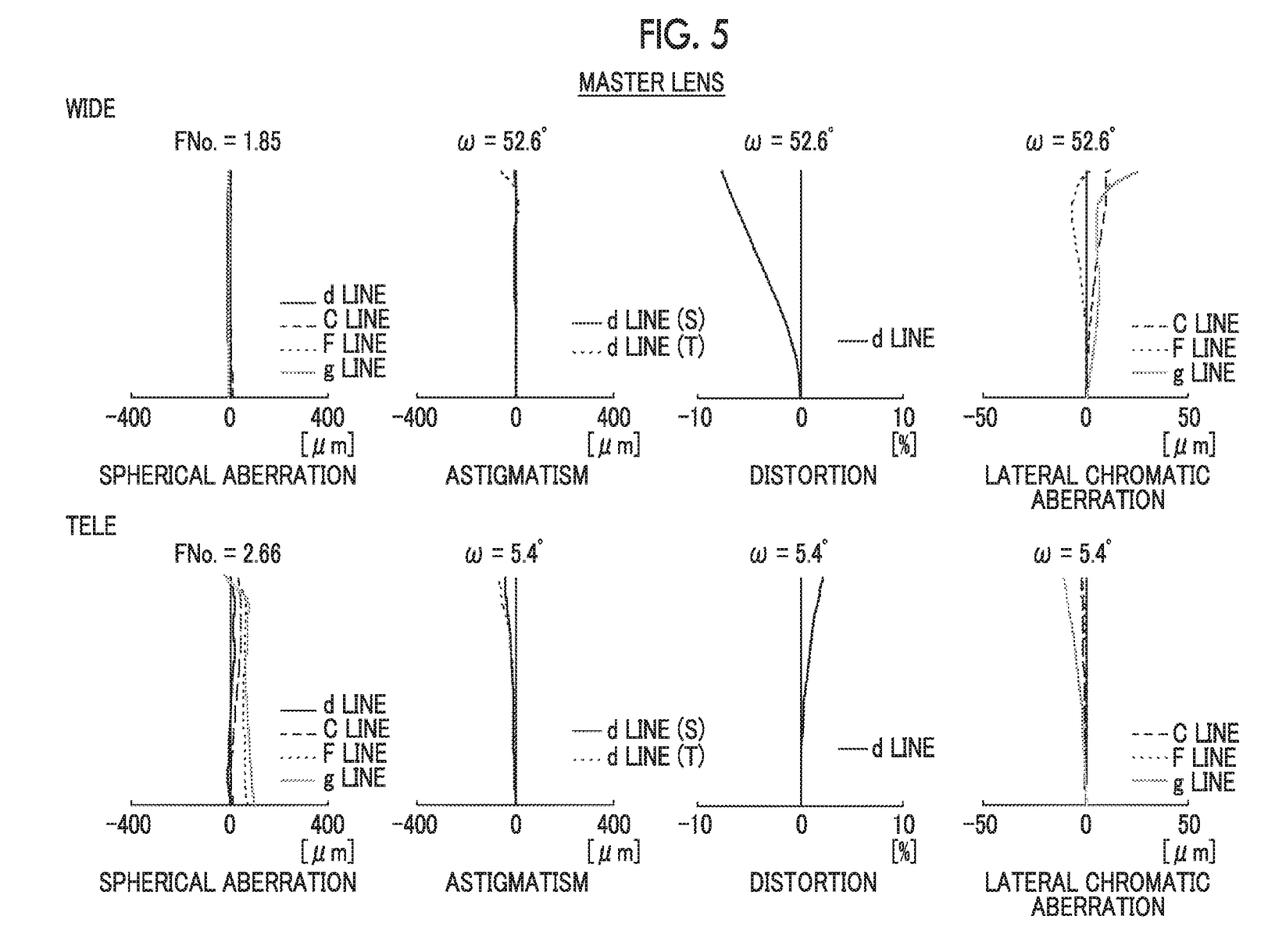
FIG. 5 is a diagram of aberrations of the master lens, and shows a spherical aberration diagram, an astigmatism diagram, a distortion diagram, and a lateral chromatic aberration diagram, in order from the left.

FIG. 5 shows a diagram of aberrations of the master lens ML of Table 1 in a state of being focused on an infinite object. In FIG. 5, the upper stage denoted by WIDE shows spherical aberration, astigmatism, distortion (distortion aberration), and lateral chromatic aberration (chromatic aberration of magnification) at the wide-angle end in order from the left, and the lower stage denoted by TELE shows spherical aberration, astigmatism, distortion, and lateral chromatic aberration at the telephoto end in order from the left. In the spherical aberration diagram, aberrations at the d line (a wavelength of 587.6 nm), a C line (a wavelength of 656.3 nm), the F line (a wavelength of 486.1 nm), and the g line (a wavelength of 435.8 nm) are shown by a solid line, a long dashed line, a short dashed line, and a gray solid line, respectively. In the astigmatism diagram, aberration at the d line in a sagittal direction is shown by a solid line, and aberration at the d line in a tangential direction is shown by a short dashed line. In the distortion diagram, aberration at the d line is shown by a solid line. In the lateral chromatic aberration diagram, aberrations at the C line, the F line, and the g line are indicated by a long dashed line, a short dashed line, and a gray solid line, respectively. FNo. in the spherical aberration diagram means an F-Number, and w in the other aberration diagrams means a half angle of view.

Example 1

The configuration diagram of an extender lens EX of Example 1 is shown in FIG. 2. The extender lens EX of Example 1 consists of a first lens group G1 having a positive refractive power and a second lens group G2 having a negative refractive power, in order from the object side. The first lens group G1 consists of a biconvex lens L11, a lens L12 having a positive meniscus shape with its convex surface toward the object side, a biconvex lens L13, a biconcave lens L14, and a biconvex lens L15, in order from the object side. The lenses L13 to L15 are cemented together and constitute a three-lens cemented lens 3CE. The second lens group G2 consists of a biconcave lens L21 and a lens L22 having a positive meniscus shape with its convex surface toward the object side, in order from the object side. The lens L21 and the lens L22 are cemented together.

Table 4 shows basic lens data of the extender lens EX of Example 1. Symbols or description methods used in Table 4 are basically the same as those in Table 1. However, the point of the optical member P and the stop St not being present in Table 4 and the point of the lowermost place of Di being blank in Table 4 are different from those in Table 1. This extender lens EX is removably inserted between the surface 39 and the surface 40 of the master lens ML in Table 1. An air distance between the surface 39 of the master lens ML and the surface of the extender lens EX closest to the object side and an air distance between the surface of the extender lens EX closest to the image side and the surface 40 of the master lens ML when this extender lens EX is inserted into the master lens ML are shown downward outside of the frame of Table 4, as "an air distance from the surface 39 of the master lens" and "an air distance from the surface 40 of the master lens".

Table 5 shows a zoom ratio Zr, a focal length f of the whole system, an F-Number FNo., and the maximum total angle of view 2ω, on the basis of the d line, as the specifications of the whole system having the extender lens EX of Example 1 inserted between the surface 39 and the surface 40 in Table 1. The term "whole system" as used herein refers to a system consisting of the master lens ML, the extender lens EX, and the optical member P.

TABLE 4

Example 1

| Si | Ri | Di | Ndj | νdj | θgFj |
|---|---|---|---|---|---|
| 1 | 29.63361 | 5.240 | 1.59282 | 68.62 | 0.54414 |
| 2 | −688.89653 | 0.120 | | | |
| 3 | 38.53944 | 3.078 | 1.49700 | 81.54 | 0.53748 |
| 4 | 170.23123 | 0.497 | | | |
| 5 | 33.32860 | 4.497 | 1.71700 | 47.93 | 0.56062 |
| 6 | −65.56211 | 0.912 | 2.00100 | 29.13 | 0.59952 |
| 7 | 14.99199 | 5.721 | 1.57501 | 41.50 | 0.57672 |
| 8 | −122.34044 | 1.797 | | | |
| 9 | −71.03797 | 0.986 | 1.88300 | 40.76 | 0.56679 |
| 10 | 11.88983 | 2.810 | 1.89286 | 20.36 | 0.63944 |
| 11 | 21.74188 | | | | |

An air distance from the surface 39 of the master lens: 1.980

An air distance from the surface 40 of the master lens: 6.892

TABLE 5

Example 1 + Master Lens

| | WIDE | TELE |
|---|---|---|
| Zr | 1.0 | 12.6 |
| f | 9.048 | 113.554 |
| FNo. | 3.60 | 5.16 |
| 2ω(°) | 66.0 | 5.6 |

Figure 6:
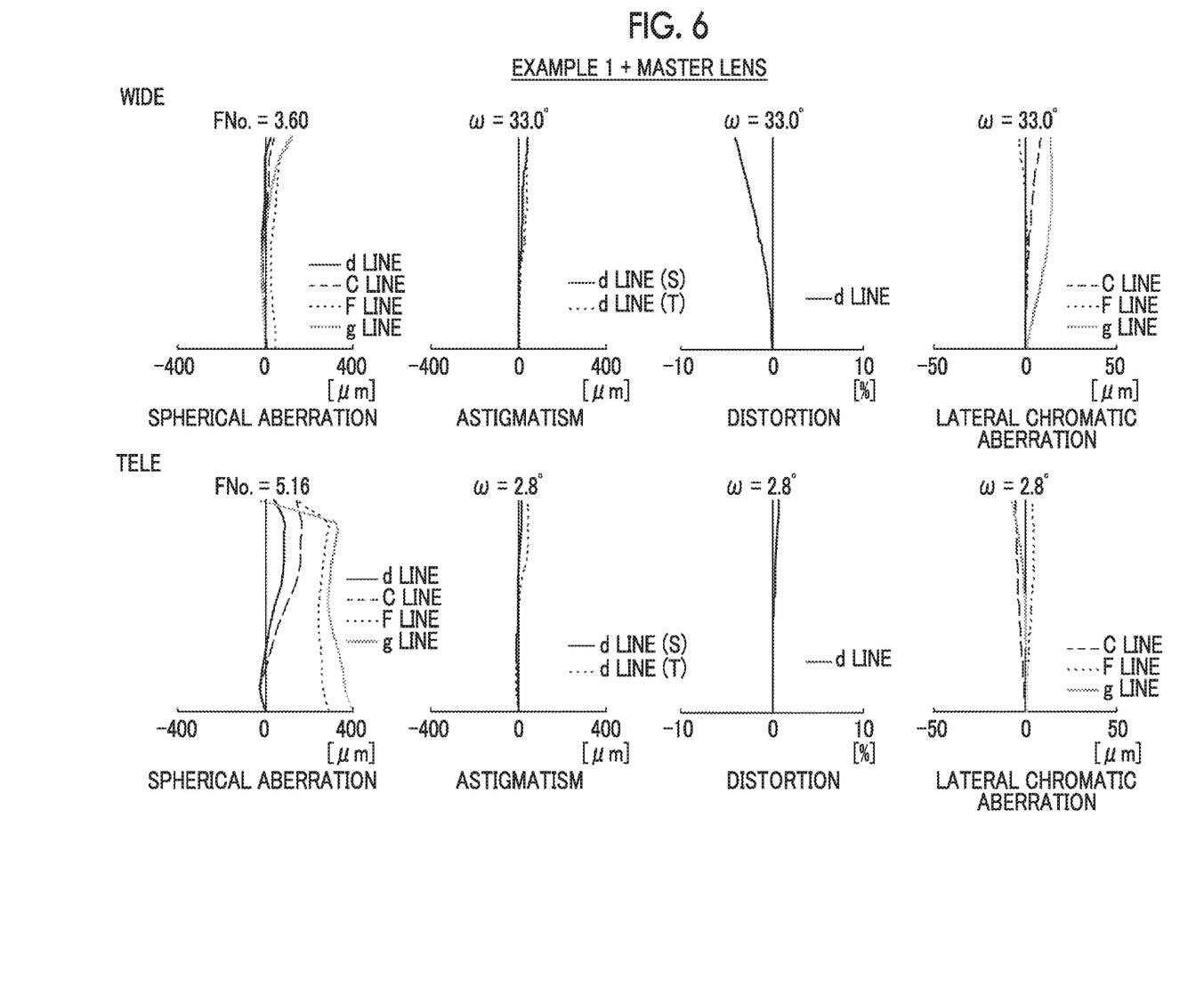
FIG. 6 is a diagram of aberrations in a state where the extender lens of Example 1 of the present invention is inserted into the master lens, and shows a spherical aberration diagram, an astigmatism diagram, a distortion diagram, and a lateral chromatic aberration diagram, in order from the left.

FIG. 6 shows a diagram of aberrations in a state of being focused on an infinite object of the whole system having the extender lens EX of Example 1 inserted between the surface 39 and the surface 40 in Table 1. Symbols or description methods used in FIG. 6 are basically the same as those in FIG. 5.

Illustration methods, symbols of respective pieces of data, description methods, and the like relating to the extender lens EX of Example 1 are the same as those in the following examples unless otherwise noted, and thus the repeated description thereof will be omitted below.

Example 2

Figure 3:
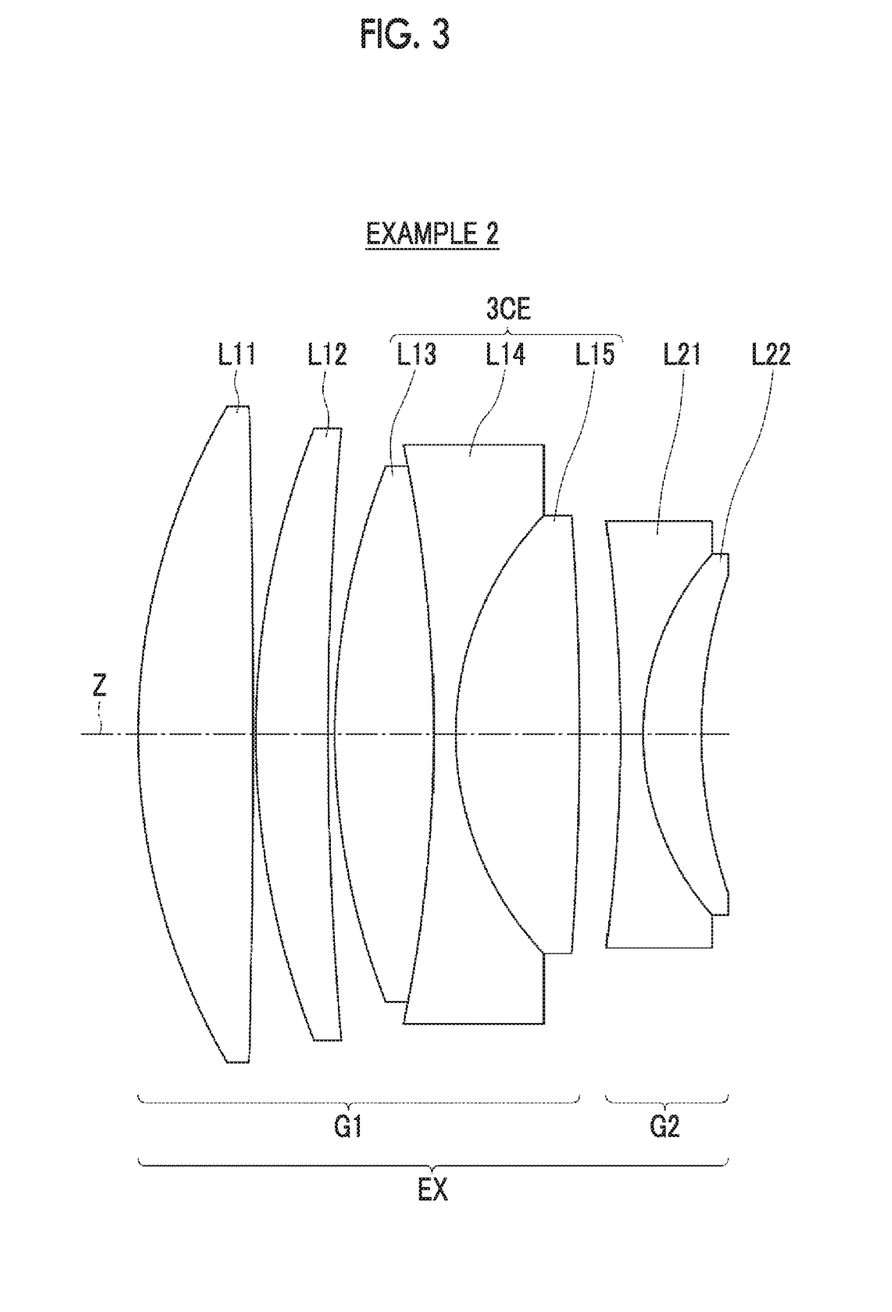
FIG. 3 is a cross-sectional view illustrating a configuration of an extender lens of Example 2 of the present invention.

FIG. 3 shows a configuration diagram of an extender lens EX of Example 2. The extender lens EX of Example 2 consists of a first lens group G1 having a positive refractive power and a second lens group G2 having a negative refractive power, in order from the object side. The first lens group G1 consists of lenses L11 to L15, and the second lens group G2 consists of lenses L21 and L22. The concavo-convex shape and the sign of refractive power of the whole lens and the cemented lens of Example 2 are the same as those in Example 1.

Figure 7:
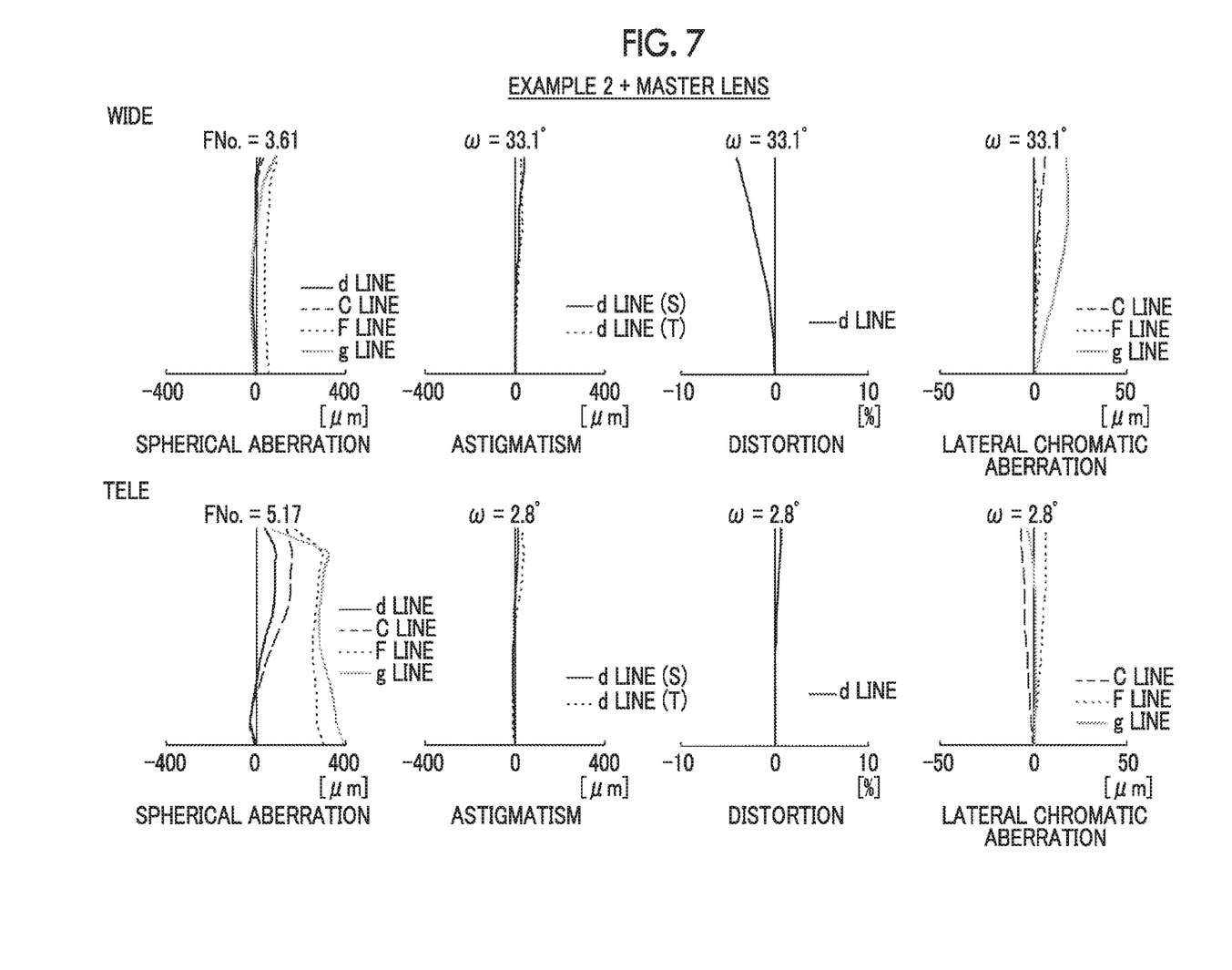
FIG. 7 is a diagram of aberrations in a state where the extender lens of Example 2 of the present invention is inserted into the master lens, and shows a spherical aberration diagram, an astigmatism diagram, a distortion diagram, and a lateral chromatic aberration diagram, in order from the left.

Table 6 shows basic lens data of the extender lens EX of Example 2. Table 7 shows specifications of the whole system having the extender lens EX of Example 2 inserted between the surface 39 and the surface 40 in Table 1, and FIG. 7 shows a diagram of aberrations in a state of being focused on an infinite object of this the whole system.

TABLE 6

Example 2

| Si | Ri | Di | Ndj | νdj | θgFj |
|---|---|---|---|---|---|
| 1 | 29.65264 | 5.263 | 1.59282 | 68.62 | 0.54414 |
| 2 | −595.02706 | 0.120 | | | |
| 3 | 38.13813 | 3.298 | 1.49700 | 81.54 | 0.53748 |
| 4 | 159.77617 | 0.312 | | | |
| 5 | 33.33223 | 4.514 | 1.68440 | 57.28 | 0.54264 |
| 6 | −64.65274 | 0.983 | 1.95375 | 32.32 | 0.59015 |
| 7 | 14.44653 | 5.661 | 1.54798 | 48.84 | 0.56178 |
| 8 | −137.43755 | 1.839 | | | |
| 9 | −73.33010 | 1.037 | 1.88300 | 40.76 | 0.56679 |
| 10 | 12.37746 | 2.668 | 1.89286 | 20.36 | 0.63944 |
| 11 | 22.30428 | | | | |

An air distance from the surface 39 of the master lens: 1.980

An air distance from the surface 40 of the master lens: 6.854

TABLE 7

Example 2 + Master Lens

| | WIDE | TELE |
|---|---|---|
| Zr | 1.0 | 12.6 |
| f | 9.046 | 113.533 |

TABLE 7-continued

| Example 2 + Master Lens | | |
|---|---|---|
| | WIDE | TELE |
| FNo. | 3.61 | 5.17 |
| 2ω(°) | 66.2 | 5.6 |

Example 3

Figure 4:
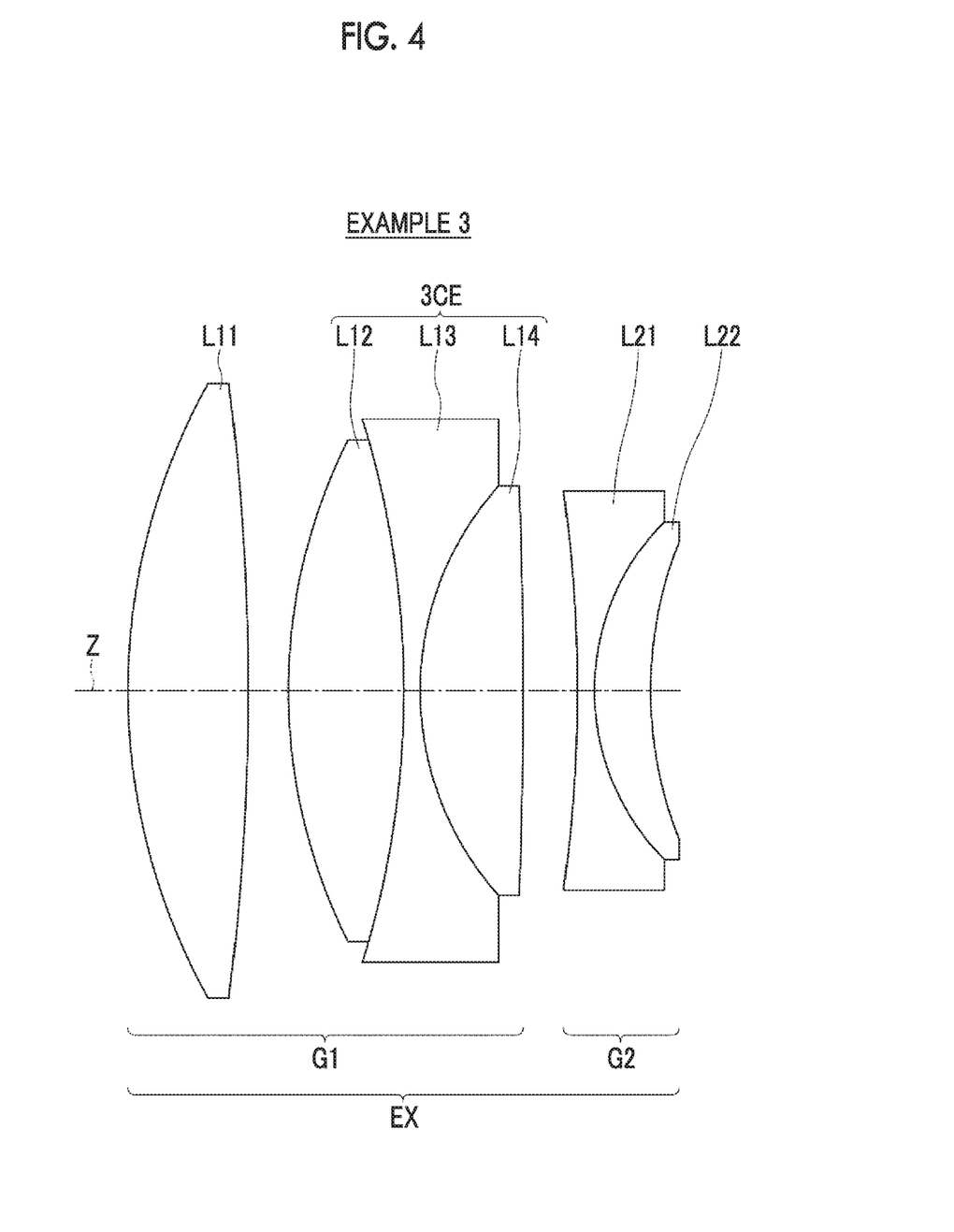
FIG. 4 is a cross-sectional view illustrating a configuration of an extender lens of Example 3 of the present invention.

FIG. 4 shows a configuration diagram of an extender lens EX of Example 3. The extender lens EX of Example 3 consists of a first lens group G1 having a positive refractive power and a second lens group G2 having a negative refractive power, in order from the object side. The first lens group G1 consists of a biconvex lens L11, a biconvex lens L12, a biconcave lens L13, and a biconvex lens L14, in order from the object side. The lenses L12 to L14 are cemented together and constitute a three-lens cemented lens 3CE. The second lens group G2 consists of lenses L21 and L22. The concavo-convex shape and the sign of refractive power of the whole lens and the cemented lens of the second lens group G2 of Example 3 are the same as those in Example 1.

Figure 8:
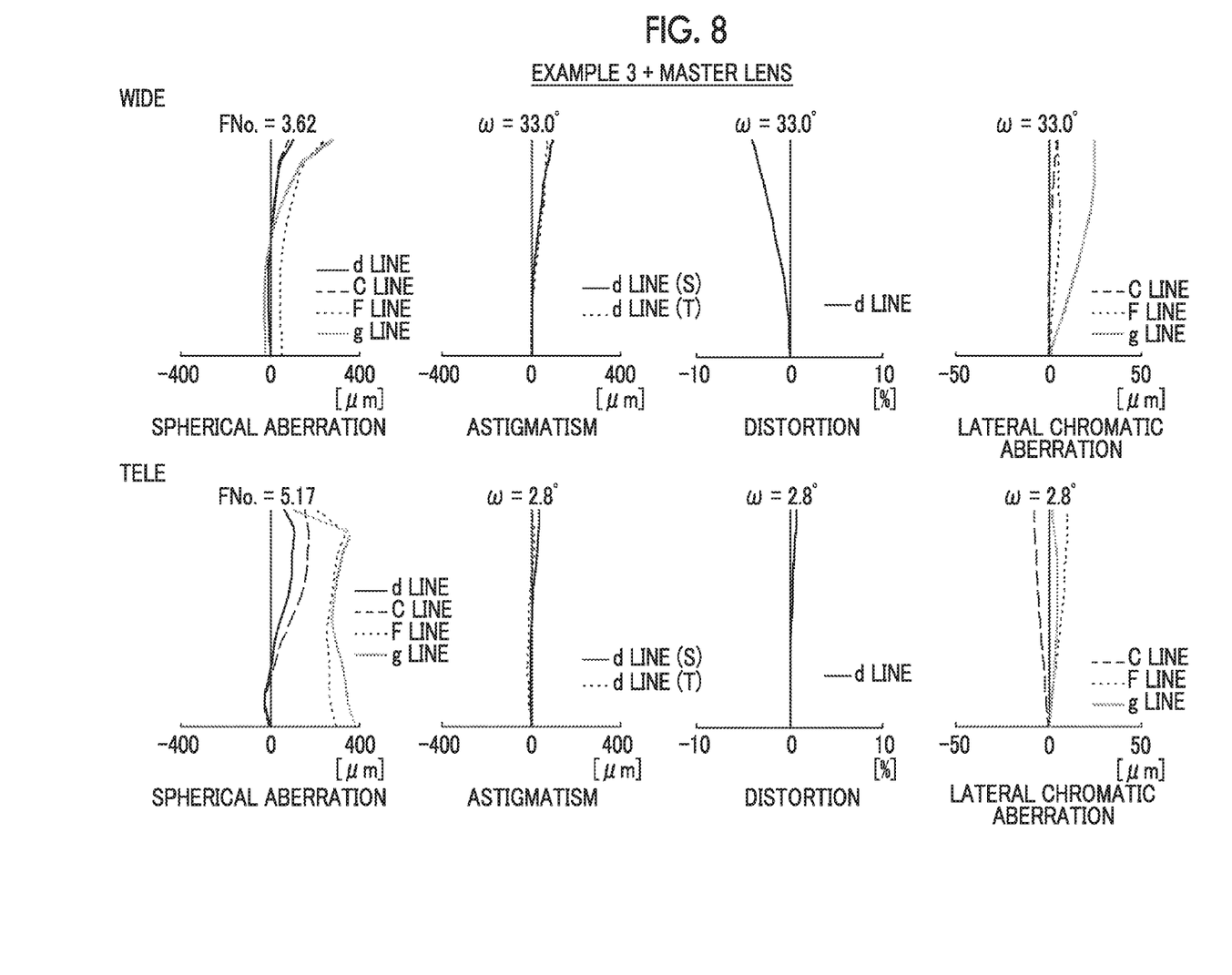
FIG. 8 is a diagram of aberrations in a state where the extender lens of Example 3 of the present invention is inserted into the master lens, and shows a spherical aberration diagram, an astigmatism diagram, a distortion diagram, and a lateral chromatic aberration diagram, in order from the left.

Table 8 shows basic lens data of an extender lens EX of Example 3. Table 9 shows specifications of the whole system having the extender lens EX of Example 3 inserted between the surface 39 and the surface 40 in Table 1, and FIG. 8 shows a diagram of aberrations in a state of being focused on an infinite object of this the whole system.

TABLE 8

| Example 3 | | | | | |
|---|---|---|---|---|---|
| Si | Ri | Di | Ndj | νdj | θgFj |
| 1 | 30.62443 | 5.857 | 1.49700 | 81.54 | 0.53748 |
| 2 | −121.20457 | 1.968 | | | |
| 3 | 27.20020 | 5.653 | 1.91082 | 35.25 | 0.58224 |
| 4 | −44.27496 | 0.800 | 2.00100 | 29.13 | 0.59952 |
| 5 | 14.95763 | 5.038 | 1.58913 | 61.23 | 0.53979 |
| 6 | −257.65224 | 2.626 | | | |
| 7 | −72.33774 | 0.810 | 1.89800 | 34.00 | 0.58703 |
| 8 | 11.66987 | 2.747 | 1.95906 | 17.47 | 0.65993 |
| 9 | 19.65546 | | | | |

An air distance from the surface 39 of the master lens: 1.979

An air distance from the surface 40 of the master lens: 7.051

TABLE 9

| Example 3 + Master Lens | | |
|---|---|---|
| | WIDE | TELE |
| Zr | 1.0 | 12.6 |
| f | 9.047 | 113.539 |
| FNo. | 3.62 | 5.17 |
| 2ω(°) | 66.0 | 5.6 |

Table 10 shows values corresponding to Conditional Expressions (1) to (8) of the extender lenses EX of Example 1 to 3. The values shown in Table 10 are based on the d line except the values corresponding to Conditional Expression (7).

TABLE 10

| EXPRESSION NUMBER | | Example 1 | Example 2 | Example 3 |
|---|---|---|---|---|
| (1) | ν1n | 29.13 | 32.32 | 29.13 |
| (2) | ν1pa − ν1n | 30.77 | 31.75 | 30.21 |
| (3) | f1/f1n | −2.907 | −2.942 | −3.009 |
| (4) | N2a | 1.88793 | 1.88793 | 1.92853 |
| (5) | N2na − N2pa | −0.00986 | −0.00986 | −0.06106 |
| (6) | N1n | 2.00100 | 1.95375 | 2.00100 |
| (7) | θ1n | 0.59952 | 0.59015 | 0.59952 |
| (8) | N1n − N1pa | 0.40554 | 0.37320 | 0.33535 |

Figure 9:
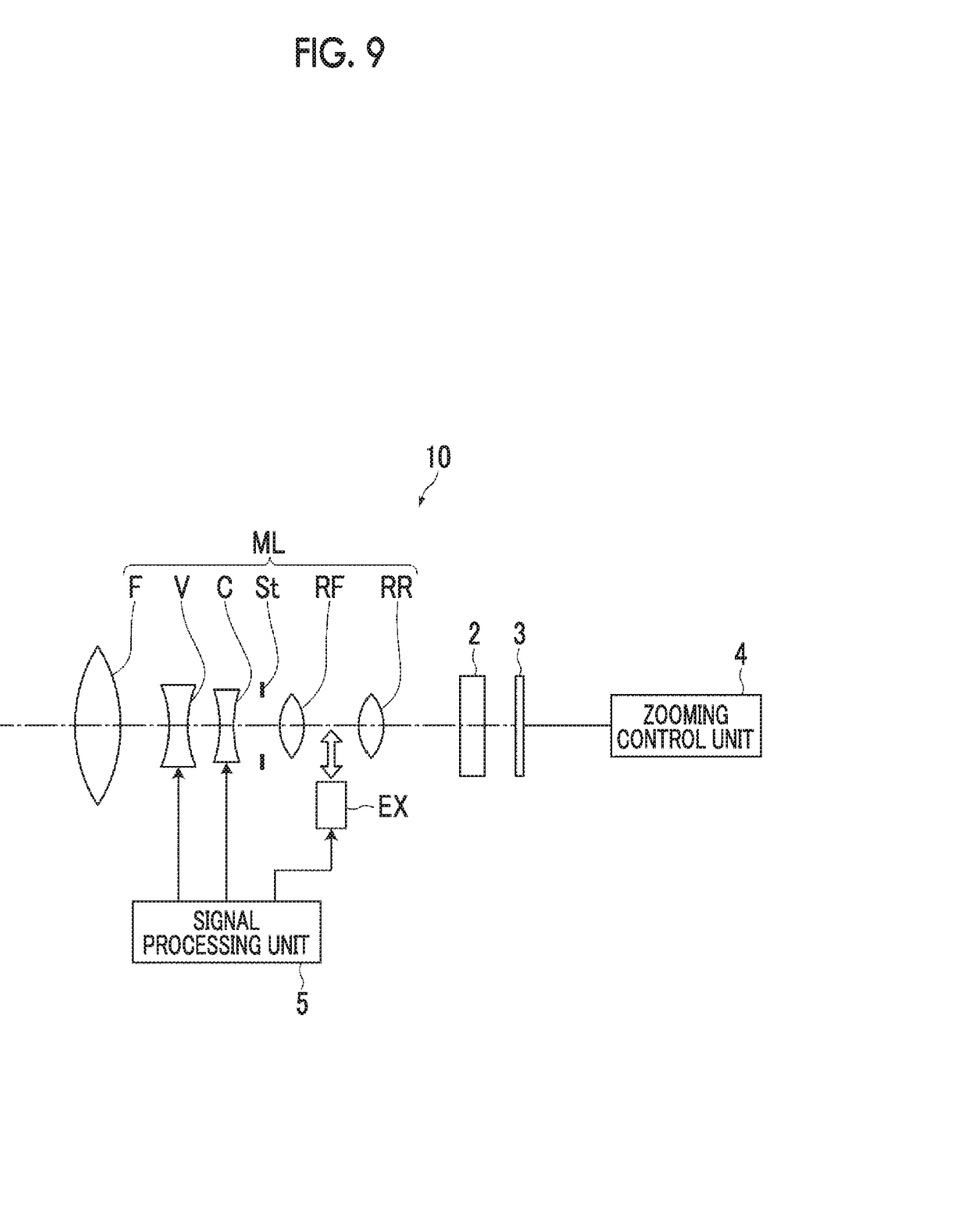
FIG. 9 is a schematic configuration diagram of an imaging apparatus according to an embodiment of the present invention.

Next, an imaging apparatus according to an embodiment of the present invention will be described. FIG. 9 shows a schematic configuration diagram of an imaging apparatus 10 using an extender lens EX according to an embodiment of the present invention, as an example of the imaging apparatus according to an embodiment of the present invention. Examples of the imaging apparatus 10 include a motion-picture camera, a broadcast camera, a digital camera, a video camera, a surveillance camera, or the like.

The imaging apparatus 10 includes a master lens ML, an extender lens EX which is removably inserted into the master lens ML, a filter 2 disposed on the image side of the master lens ML, an imaging element 3 disposed on the image side of the filter 2, a signal processing unit 4 that arithmetically processes an output signal from the imaging element 3, and a zooming controller 5 that controls zooming of a lens system. Meanwhile, FIG. 9 schematically shows respective lens groups which are included in the extender lens EX and the master lens ML. The imaging element 3 converts an optical image into an electrical signal, and can have, for example, a charge coupled device (CCD), a complementary metal oxide semiconductor (CMOS) or the like used thereas. The imaging element 3 is disposed so that the imaging surface thereof is coincident with the imaging surface of the master lens ML. Meanwhile, in FIG. 9, only one imaging element 3 is shown, but the imaging apparatus of the present invention may be a so-called three-plate type of imaging apparatus having three imaging elements without being limited thereto. The zooming of the master lens ML and the insertion or extraction of the extender lens EX are performed by the zooming controller 5.

Hereinbefore, the present invention has been described through embodiments and examples, but the present invention is not limited to the above-described embodiments and examples, and can be variously modified. For example, the curvature radius, the surface distance, the refractive index, the Abbe number, the partial dispersion ratio, and the like of each lens are not limited to the values shown in each of the numerical value examples, and can have other values used therefor. In addition, the master lens to which the present invention can be applied is not limited to the above examples, and may be a zoom lens, a varifocal lens, or a fixed-focus optical system which has other configurations.

What is claimed is:

1. An extender lens, removably inserted into a master lens for imaging, which makes a focal length of a whole lens system after insertion longer than a focal length of the master lens while maintaining an imaging position constant, the extender lens comprising, in order from an object side:
   a first lens group having a positive refractive power as a whole; and
   a second lens group having a negative refractive power as a whole, wherein the first lens group consists of one or more positive lenses in order from the object side, and a three-lens cemented lens having three lenses of a positive lens, a negative lens, and a positive lens cemented together in order from the object side, and the following Conditional Expression (1) is satisfied, $$26 < \nu 1n < 40 \qquad (1)$$

where $\nu 1n$ is an Abbe number of the negative lens constituting the three-lens cemented lens on the basis of a d line.

2. The extender lens according to claim 1, wherein the following Conditional Expression (2) is satisfied, $$25 < \nu 1pa - \nu 1n < 35 \qquad (2)$$

where $\nu 1pa$ is an average of Abbe numbers of positive lenses constituting the first lens group on the basis of the d line.

3. The extender lens according to claim 1, wherein the following Conditional Expression (3) is satisfied, $$-5 < f1/f1n < -2 \qquad (3)$$

where f1 is a focal length of the first lens group, and f1n is a focal length of the negative lens constituting the three-lens cemented lens.

4. The extender lens according to claim 1, wherein the second lens group consists of one or more positive lenses and one or more negative lenses, and the following Conditional Expression (4) is satisfied, $$1.8 < N2a < 2.05 \qquad (4)$$

where N2a is an average of refractive indices of lenses constituting the second lens group at the d line.

5. The extender lens according to claim 1, wherein the second lens group consists of one or more negative lenses and one or more positive lenses, and the following Conditional Expression (5) is satisfied, $$-0.1 < N2na - N2pa < 0 \qquad (5)$$

where N2na is an average of refractive indices of negative lenses constituting the second lens group at the d line in a case where the second lens group includes a plurality of negative lens, and is a refractive index of a negative lens constituting the second lens group at the d line in a case where the second lens group includes one negative lens, and N2pa is an average of refractive indices of positive lenses constituting the second lens group at the d line in a case where the second lens group includes a plurality of positive lenses, and is a refractive index of a positive lens constituting the second lens group at the d line in a case where the second lens group includes one positive lens.

6. The extender lens according to claim 1, wherein the following Conditional Expression (6) is satisfied, $$1.9 < N1n < 2.05 \qquad (6)$$

where N1n is a refractive index of the negative lens constituting the three-lens cemented lens at the d line.

7. The extender lens according to claim 1, wherein the following Conditional Expression (7) is satisfied, $$0.55 < \theta 1n < 0.605 \qquad (7)$$

where $\theta 1n$ is a partial dispersion ratio of the negative lens constituting the three-lens cemented lens between a g line and an F line.

8. The extender lens according to claim 1, wherein the following Conditional Expression (8) is satisfied, $$0.3 < N1n - N1pa < 0.5 \qquad (8)$$

where N1n is a refractive index of the negative lens constituting the three-lens cemented lens at the d line, and N1pa is an average of refractive indices of positive lenses constituting the first lens group at the d line.

9. The extender lens according to claim 1, wherein the number of positive lenses of the first lens group disposed closer to the object side than to the three-lens cemented lens is equal to or less than two.

10. The extender lens according to claim 1, wherein the second lens group consists of two lenses.

11. The extender lens according to claim 10, wherein the second lens group consists of a cemented lens having a negative lens and a positive lens cemented together.

12. The extender lens according to claim 1, wherein the following Conditional Expression (1-1) is satisfied, $$28 < \nu 1n < 35 \qquad (1\text{-}1).$$

13. The extender lens according to claim 1, wherein the following Conditional Expression (2-1) is satisfied, $$25 < \nu 1pa - \nu 1n < 32 \qquad (2\text{-}1)$$

where $\nu 1pa$ is an average of Abbe numbers of positive lenses constituting the first lens group on the basis of the d line.

14. The extender lens according to claim 1, wherein the following Conditional Expression (3-1) is satisfied, $$-3.5 < f1/f1n < -2.7 \qquad (3\text{-}1)$$

where f1 is a focal length of the first lens group, and f1n is a focal length of the negative lens constituting the three-lens cemented lens.

15. The extender lens according to claim 1, wherein the second lens group consists of one or more positive lenses and one or more negative lenses, and the following Conditional Expression (4-1) is satisfied, $$1.85 < N2a < 2.05 \qquad (4\text{-}1)$$

where N2a is an average of refractive indices of lenses constituting the second lens group at the d line.

16. The extender lens according to claim 1, wherein the second lens group consists of one or more positive lenses and one or more negative lenses, and the following Conditional Expression (5-1) is satisfied, $$-0.06 < N2na - N2pa < 0 \qquad (5\text{-}1)$$

where N2na is an average of refractive indices of negative lenses constituting the second lens group at the d line in a case where the second lens group includes a plurality of negative lens, and is a refractive index of a negative lens constituting the second lens group at the d line in a case where the second lens group includes one negative lens, and N2pa is an average of refractive indices of positive lenses constituting the second lens group at the d line in a case where the second lens group includes a plurality of positive lenses, and is a refractive index of a positive lens constituting the second lens group at the d line in a case where the second lens group includes one positive lens.

17. The extender lens according to claim 1, wherein the following Conditional Expression (6-1) is satisfied, $$1.95 < N1n < 2.05 \tag{6-1}$$

where N1n is a refractive index of the negative lens constituting the three-lens cemented lens at the d line.

18. The extender lens according to claim 1, wherein the following Conditional Expression (7-1) is satisfied, $$0.57 < \theta 1n < 0.6 \tag{7-1}$$

where θ1n is a partial dispersion ratio of the negative lens constituting the three-lens cemented lens between a g line and an F line.

19. The extender lens according to claim 1, wherein the following Conditional Expression (8-1) is satisfied, $$0.33 < N1n - N1pa < 0.45 \tag{8-1}$$

where N1n is a refractive index of the negative lens constituting the three-lens cemented lens at the d line, and N1pa is an average of refractive indices of positive lenses constituting the first lens group at the d line.

20. An imaging apparatus comprising the extender lens according to claim 1.

* * * * *